Figure 1:
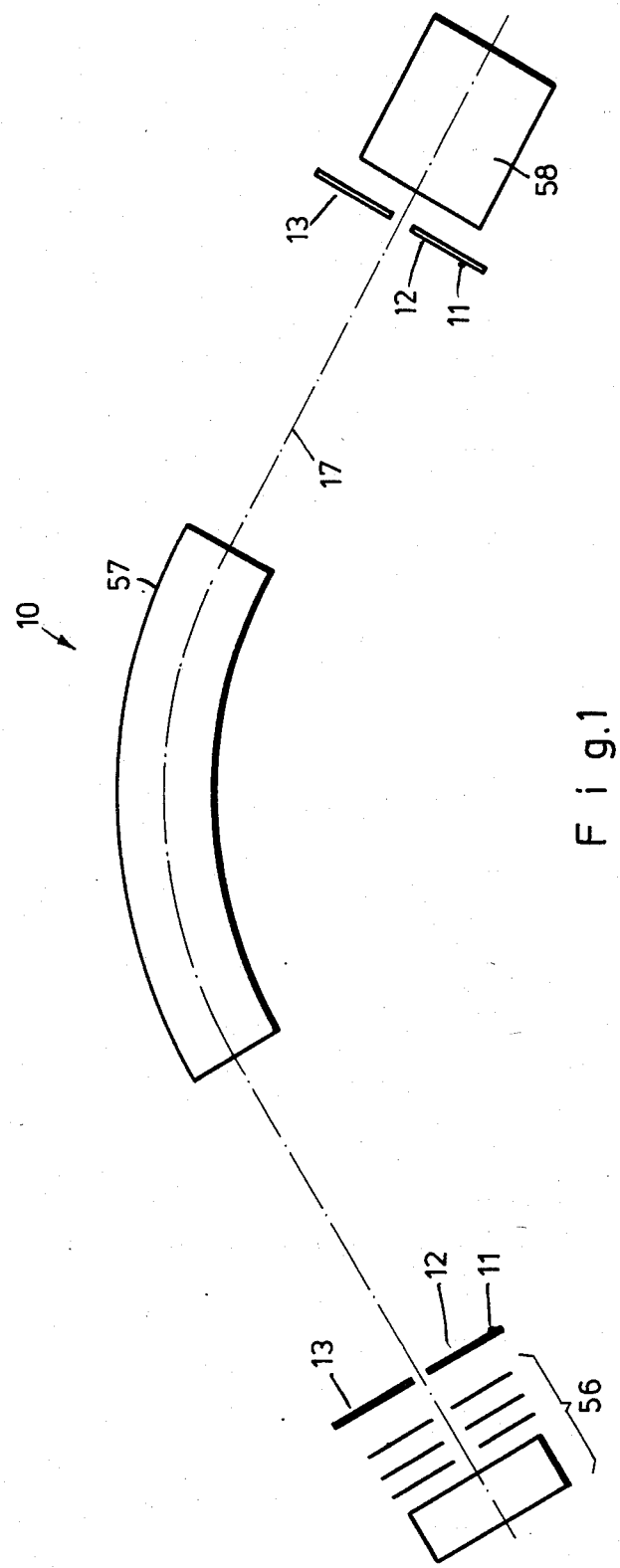

United States Patent [19]

Brunnée et al.

[11] Patent Number: 4,612,440
[45] Date of Patent: Sep. 16, 1986

[54] DEVICE FOR ADJUSTING SLIT WIDTHS IN SPECTROMETERS

[75] Inventors: Curt Brunnée, Platjenwerbe; Peter Dobberstein, Bremen; Günter Kappus, Stuhr, all of Fed. Rep. of Germany

[73] Assignee: Finnigan MAT GmbH, Fed. Rep. of Germany

[21] Appl. No.: 648,891

[22] Filed: Sep. 10, 1984

[30] Foreign Application Priority Data

Sep. 13, 1983 [DE] Fed. Rep. of Germany ....... 3332949

[51] Int. Cl.$^4$ ................................................. G01J 3/02
[52] U.S. Cl. ..................................... 250/281; 250/288; 310/331
[58] Field of Search ................... 250/281, 282, 423 R, 250/431.1, 288; 310/328, 330, 331, 332

[56] References Cited

U.S. PATENT DOCUMENTS

| 2,016,025 | 10/1935 | Scribner et al. | 310/328 |
|---|---|---|---|
| 2,619,609 | 11/1952 | Reid | 250/281 |
| 2,852,684 | 10/1958 | Payne | 250/281 |
| 3,433,945 | 3/1969 | Erickson et al. | 250/423 |
| 3,655,963 | 4/1972 | Brunee et al. | 250/281 |
| 3,928,778 | 12/1975 | Ivanov et al. | 310/331 |

Primary Examiner—Bruce C. Anderson
Assistant Examiner—Paul A. Guss
Attorney, Agent, or Firm—Flehr, Hohbach, Test, Albritton & Herbert

[57] ABSTRACT

Slit means in spectrometers for the analysis of organic and inorganic substances, in particular in mass spectrometers, have hitherto been controlled for varying the slit widths by connecting them in a suitable manner to a metallic wire, through which an electric current flowed, under the influence of which the wire heats up and changes its length. The slit or diaphragm means connected to the wire were then displaced relative to the beam path. It is a great disadvantage that the diaphragms follow a change of the current for controlling the slit widths with a relatively long time delay, which is unacceptable for various types of measuring operation, in particular types of measuring operation under data system control. To eliminate this disadvantage, a device (11) is proposed which has at least one movable slit jaw (12) which is movable to and fro, substantially perpendicular to the beam path (16) and without delay, by a piezo-electric element (14).

18 Claims, 9 Drawing Figures

DEVICE FOR ADJUSTING SLIT WIDTHS IN SPECTROMETERS

DESCRIPTION

The invention relates to a device for adjusting the slit widths of slit means in the beam path of spectrometers, in particular mass spectrometers for the analysis of organic or inorganic substances, with length-change elements operated by electrical energy.

A device of this type is known U.S. Pat. No. 3,655,963), by means of which the slit width of adjustable slit diaphragms in mass spectrometers can be adjusted. The change in the slit width itself is effected in that case by means of a wire which heats up and expands under the influence of a current flowing through it, so that slit means or diaphragm means connected to the wire are moved to and fro relative to the beam path of the mass spectrometer, in order to reduce or enlarge it in the desired manner.

The reason for this alteration, necessary for different operating conditions during the measurement in the mass spectrometer, of the slit widths of slit means is in the main that the two essential parameters of the mass spectrometer, namely the resolving power R and the sensitivity S, are in such a mutual relation that an increase in the resolving power R is in general connected with a reduction in the sensitivity S. The result is that the resolution of the mass spectrometer is always selected at just that level which is required by the particular measurement problem, in order to obtain maximum sensitivity. If, for example, in the course of a special investigation method, while carrying out a mass scan, the slit width is to be altered continuously or stepwise, it is absolutely necessary that the slit means are adjustable without inertia, that is to say without time delay, since only in this way is it possible to adapt the peak width during the mass scan to a selected scanning function.

The essential disadvantage of the known device is that, due to the use of length-change elements consisting of current-bearing wires, a change in the slit widths of the slit means takes place only with a time delay, since, after a change in the current the wire must first warm up or cool down, so that the slit means connected thereto are displaced only in the course of this length expansion or length shortening, which takes some considerable time.

The known device is not adequately suitable for measurements which require a continuous and defined slit width change, which can be predetermined precisely in time, during the measuring step. Furthermore, the mechanical construction of the known device. for adjusting the slit widths of the slit means and for their electronic activation is very involved, which has the result that, on the one hand, the initial costs are high and, on the other hand, the device is prone to repairs.

It is the object of the present invention to provide a device of the type specified above, by means of which the slit widths of the slit means can be adjusted without delay and very accurately, so that slit widths are variable with precision even during the measurement in accordance with the selected scanning function, but at the same time a very simple and effective basic structure leads to an inexpensive and operationally very reliable device.

According to the invention, the object is achieved when the device comprises at least one movable slit jaw which can be moved to and fro, substantially perpendicular to the beam path and without delay, by means of a piezoelectric element.

The piezo-electric elements used here in place of the length-change elements, hitherto used, in the form of current-bearing wires have the property of executing a relative length change when a direct voltage is applied to their electrodes. With piezo-electric elements, designed as bending elements, deflections of $\Delta x/l$ of the order of magnitude of $10^{-6} V^{-1}$ can be obtained here, $l$ being a defined characteristic length of the piezo-electric element and $\Delta x$ being the greatest possible deflection, with a voltage applied, from the base state without a voltage applied.

The piezo-electric element is here connected in a suitable manner to the slit means, so that it bends when a correspondingly large voltage is applied, and thus enlarges or reduces the slit in the beam path. Preferably, a second movable slit jaw is provided which can likewise be moved to and fro, substantially perpendicular to the beam path, by means of a piezo-electric element. With such a design it is possible to ensure that the slit jaws of the slit means can not only be moved towards one another and apart from one another as a function of the voltage applied to the piezo-electric element, but can also be moved to and fro while retaining a constant slit width, in order thus to select a certain sector of the beam which is to be allowed to pass through to the detector instruments or the like. By applying unsymmetrical voltages, the movement amplitudes of the piezo-electric elements are thus adjusted independently of one another.

Furthermore, the independent adjustability of the movement amplitudes of the piezo-electric elements and their independent mutual adjustability are preferentially suitable for reaching a slit center adjustment, so that corresponding mechanical adjustment devices can be omitted altogether, which especially simplifies the construction of the device.

Particularly if, in a sector field mass spectrometer, very high resolution is to be achieved (R greater than 5,000), it is necessary to tilt or rotate the slit about the ion beam. Preferably this is effected by slit jaws which are rotatable about the beam path axis by means of a piezo-electric element. The comparable mechanical devices for rotating the slit jaws are very expensive, since the mechanical structure and the control for actuating the rotary movement must be designed with great precision.

It is a particular advantage of the device that the movement amplitudes of the piezo-electric elements moving the slit jaws are controllable by a data system, so that the programmed control algorithm can be converted directly into changes in movement, so that delays due to mechanical or electrical causes, as in the known device, are completely absent. Furthermore, after the usual previous initial adjustment, the data system can also be used for a fine adjustment of both the slit center and the rotational angle alpha by remote control, so that the operability is substantially improved.

The device itself preferably has a mounting plate with an orifice for letting the beam pass through and comprises carrier plates for receiving the piezo-electric elements, projecting substantially perpendicular from the mounting plate, the carrier plates being provided, at their ends pointing away from the mounting plate, with slit jaws, the slit-forming end parts of which, substantially perpendicular to the axis of the beam path passing through the slit, project into the beam path. A device designed in this way can be introduced at desired suitable points into the beam path of analysis instruments, in particular mass spectrometers, in order to serve there as a slit or diaphragm means which can be controlled from the outside.

According to another advantageous embodiment, a second mounting plate having an orifice for letting the beam pass through is arranged below the mounting plate to be axially rotatable relative to the latter, which second mounting plate receives, in a region offset from the orifice, a stop which is in contact with the carrier plate receiving the piezo-electric element for rotating the slit jaws, the carrier plate being fixed with its end pointing away from the stop to the first mounting plate. The rotation of the slit, required for high resolving power of the mass spectrometer in certain investigations, can be obtained by the advantageously simple embodiment of the device, designed in this way, and this tilting or rotating movement of the slit can also be controlled from the outside.

Furthermore, the invention relates to a mass spectrometer for the analysis of organic and inorganic substances, which comprises an ion source, a magnetic sector field, an ion detector as well as source and detector slit means of adjustable slit width.

A great disadvantage of the prior art mass spectrometers of this type is that the slit means, such as, for example, source and detector slit means, did not react immediately to control signal changes for altering their slit widths, but only with a certain time delay. Slit means controllable in this way with a time delay are of only limited suitability for use in operational measurement sequences which require slit means which can be adjusted continuously and without delay, controlled in accordance with the measuring function.

It is an object of this invention to overcome these disadvantages.

This object of the invention is achieved when the slit means are adjustable without delay by a device provided with piezo-electric elements. Preferably, not only the actual source and detector slit means can be adjusted without delay, but also other diaphragm means which are provided in the beam path and the diaphragm aperture of which is variable by analogously designed devices provided with piezo-electric elements.

Further advantageous embodiments of the device and of the mass spectrometer are given by the sub-claims.

Figure 3:
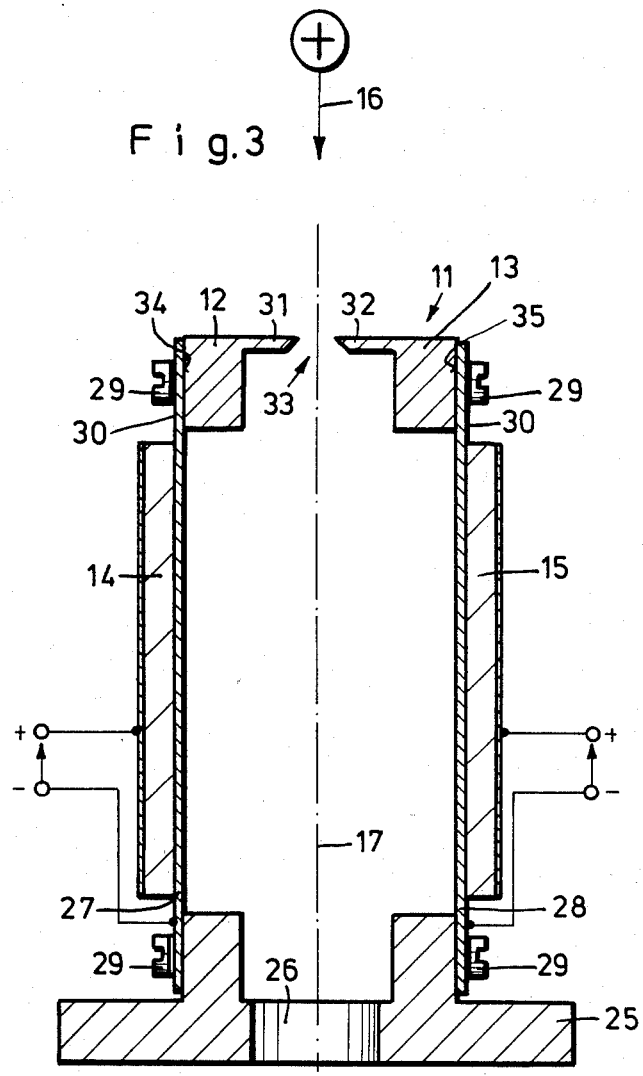
Figure 2:
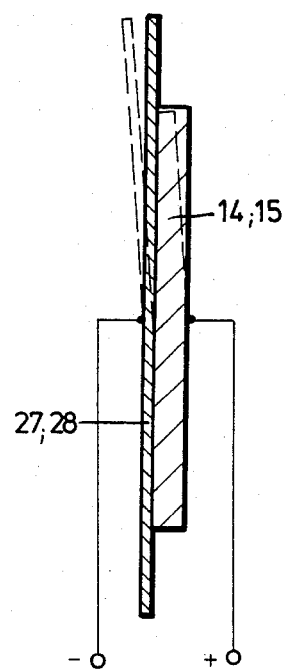
Figure 4:
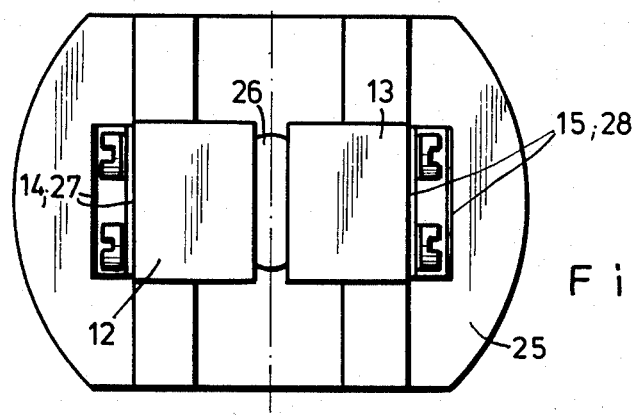
Figure 5:
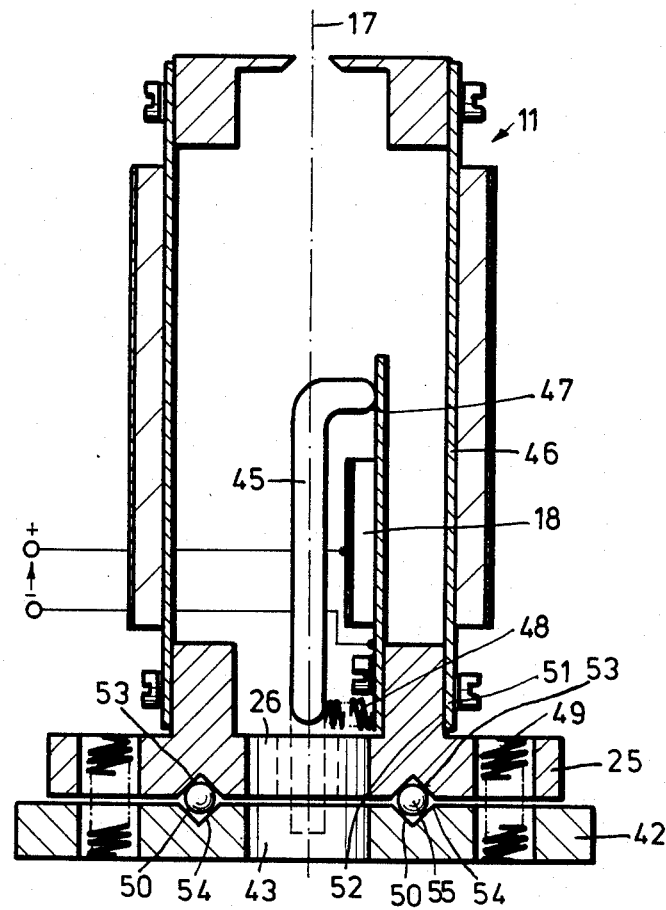
Figure 6:
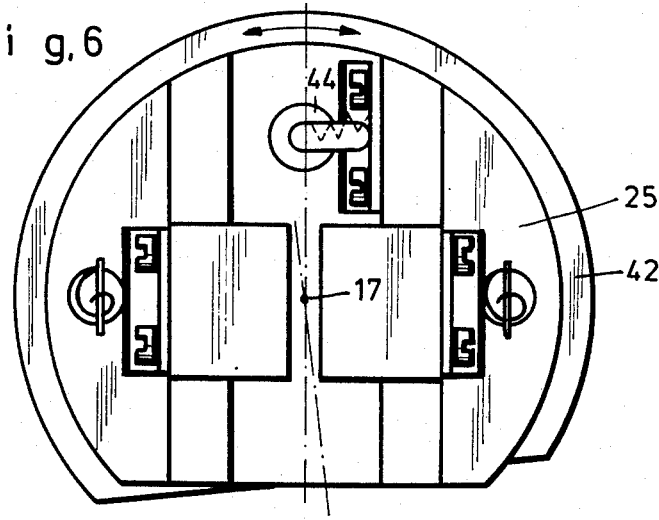
Figure 7:
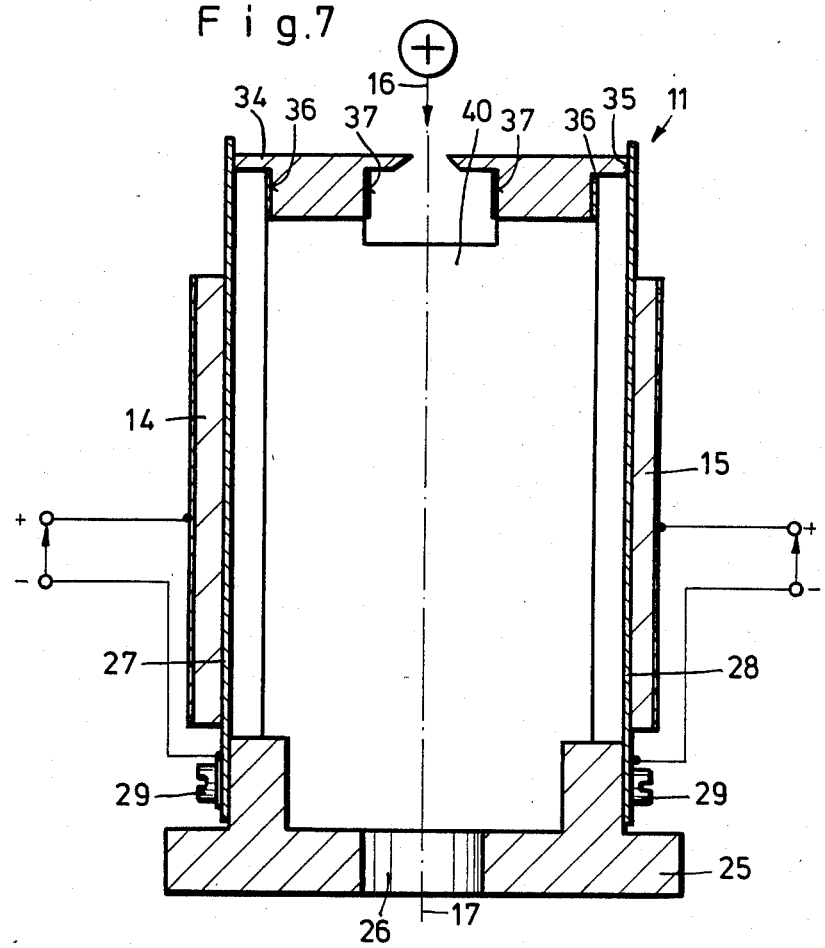
Figure 8:
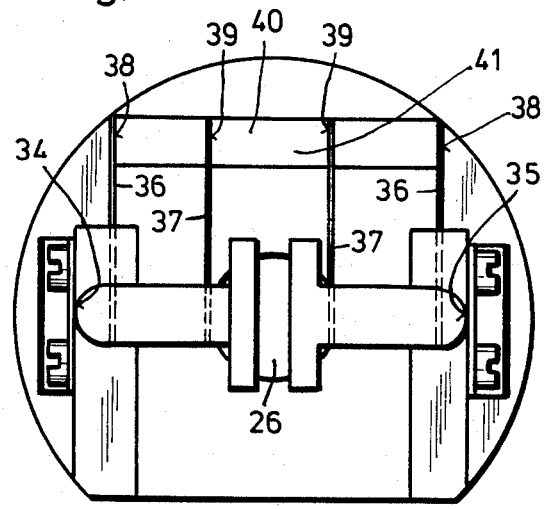
Figure 9:
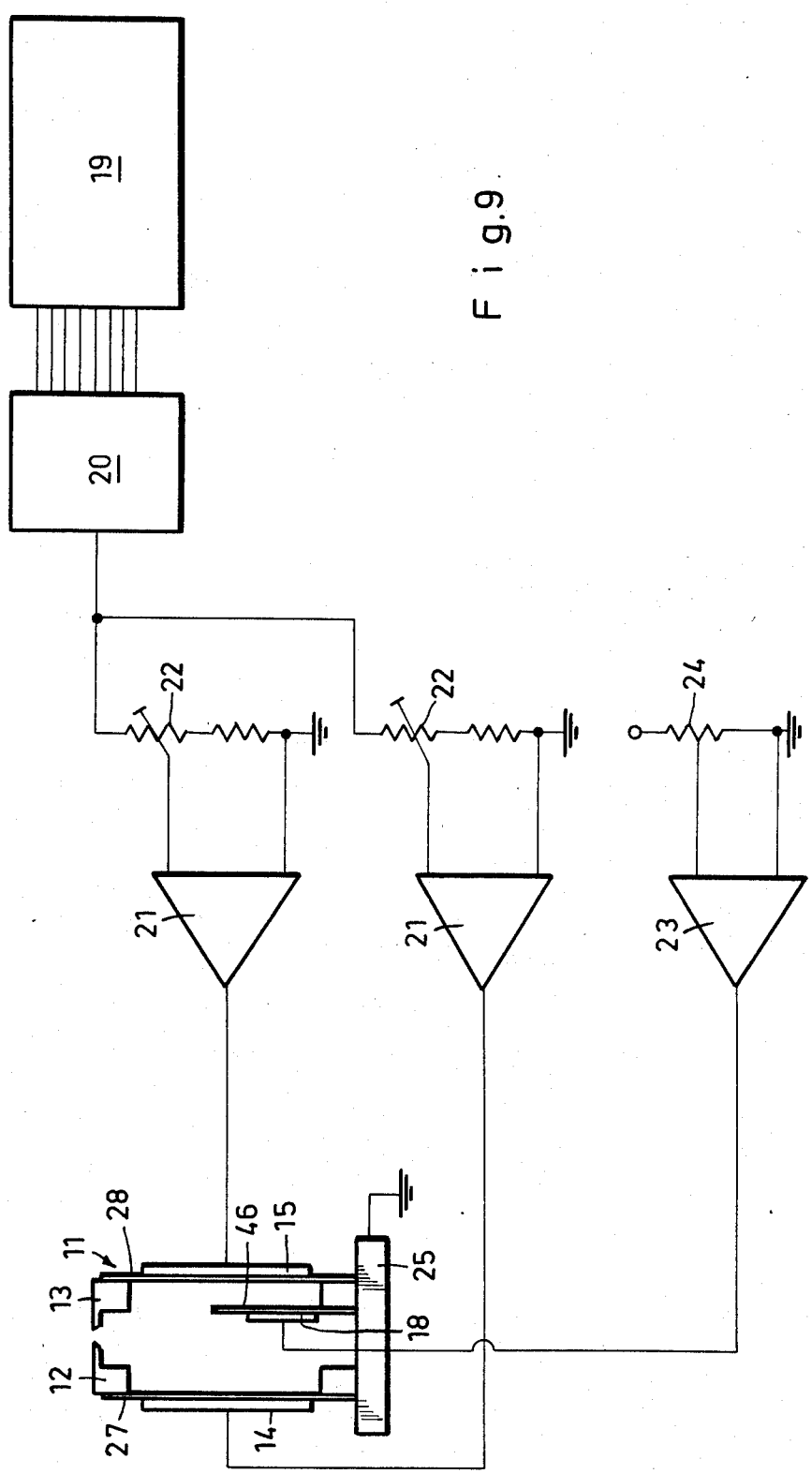

The invention will now be described in detail by means of an illustrative embodiment, with reference to the following diagrammatic drawings in which:

FIG. 1 shows a diagram of an analysis arrangement in the form of a mass spectrometer with source slit means and detector slit means, FIG. 2 diagrammatically shows the structure of a piezo-electric element with a carrier plate, in section, FIG. 3 shows a side view of the device, in section, FIG. 4 shows the plan view of the device shown in FIG. 3, FIG. 5 shows a device which substantially corresponds to the device of FIG. 3, but has additional fittings for effecting a rotational movement of the slit, in section, FIG. 6 shows the plan view of the device shown in FIG. 5, FIG. 7 shows another embodiment of the device, in section, FIG. 8 shows the plan view of the device shown in FIG. 7, and FIG. 9 shows a block diagram for controlling the device by means of a data system via amplifier devices.

A mass spectrometer 10 essentially comprises an ion source 56, provided with focusing means, a source slit means 11, a magnetic sector 57, a detector slit means 11 and a detector 58, all these components being arranged one behind the other essentially on the beam path axis 17 of the ion beam.

The device 11 forming the slit means essentially consists of a mounting plate 25 which is provided with an orifice 26, extending substantially perpendicular to the plane of the mounting plate, for letting the beam pass through, and carrier plates 27, 28 are provided which project essentially perpendicular from the mounting plate 25. The carrier plates 27, 28 are fixed via fastening means, for example screws 29, to webs or the like formed on the mounting plate. At their ends 30 pointing away from the mounting plate 25, the carrier plates 27, 28 are provided with the actual slit jaws 12,13 which form the slit and the end parts 31, 32 of which are aligned essentially perpendicular to the axis 17 of the beam path 16, passing through the slit 33, and project into the beam path. The two slit jaws 12, 13 are fixed to the ends 34, 35 of the carrier plates 27, 28 with fastening means 29, for example screws.

The carrier plates 27, 28, which can consist of a metallic material, for example stainless steel, form, together with a piezo- electric ceramic body fitted thereto, the particular piezo-electric elements 14, 15, the electrodes of each of the piezo-electric elements 14, 15 being formed, on the one hand, by the particular carrier plate 27, 28 and, on the other hand, by metal electrodes which are each vapor-deposited on the piezo-ceramic body which is located, substantially parallel, opposite each of the carrier plates 27, 28.

According to the illustration in FIG. 2, the piezo-electric element 14, 15 undergoes a path change by $\Delta x$, when a direct voltage is applied to its two electrodes. The deflections $\Delta x/l$ are of the order of magnitude of $10^{-6} V^{-1}$, the maximum operating voltage of these elements being about 1000 V.

The device 11 shown in FIGS. 7 and 8 has substantially the same structure as the device represented above, but differs from the latter in that the carrier plates 27, 28, with their ends 30 pointing away from the mounting plate 25, are in contact with the rear 34, 35 of the slit jaws 12, 13, the slit-forming end parts 31, 32 of the slit jaws 12, 13 being aligned substantially perpendicular to the axis of the beam path 16, passing through the slit 33, and projecting into the beam path. The slit jaws 12, 13 are here held in this position by leaf spring means 36, 37 which are fixed thereto and extend substantially parallel to the carrier plates 27, 28 and which, at their ends 38, 39 remote from the slit jaws 12, 13, are fixed to a carrier 40 which is fixed to the mounting plate 25 in a region 44 offset from the orifice 26. The leaf spring means 36, 37 here form a spring parallelogram, the spring force of which holds the slit jaws in a predetermined base position. When a voltage is applied to the piezo-electric element or elements 14, 15, the slit jaws are moved towards one another, so that the slit 33 becomes smaller. When the voltage applied to the piezo-electric elements is reduced, the deflecting force of the spring assists the return movement of the slit jaws 12, 13, caused by the piezo-electric elements, in order to enlarge the slit 33.

In order to achieve a very high resolving power of, for example, R greater than 5,000 in mass spectrometers, slit means must be rotated relative to the beam path axis 17. The tilting or rotating angle alpha required for this purpose is only a few mrad. For this purpose, the device 11 described above has, below the mounting plate 25, a second mounting plate 42 which is axially rotatable relative thereto and has an orifice 43 for letting the beam pass through, which second mounting plate receives, in a region 44 offset from the orifice 43, a stop 45 which is in contact with a carrier plate 46 receiving a piezoelectric element 18 for rotating the slit jaws 12, 13, the carrier plate 46 being fixed with its end 47 pointing away from the stop 45 in a suitable manner to the first mounting plate 25. Correspondingly to the fixing of the carrier plates 27, 28 of the piezo-electric elements 14, 15, this can be effected on the inside of the web projecting upwards from the mounting plate 25, by means of fastening means 29, such as screws. The stop 45 is then brought by spring means 48 into contact with the carrier plate 46.

The mounting plates 25, 42 are here drawn towards each other by further spring means 49 which are arranged, for example, in two bores passing substantially vertically through the mounting plates 25, 42 and are fixed in a suitable manner to the mounting plate 25 on one side and to the mounting plate 42 on the other side. The holes are here of such a size that, even with the spring 49 inserted, a certain rotation of the two mounting plates 25, 42 relative to one another is possible.

Furthermore, the mounting plates 25, 42 have rotational bearing means 50 which are formed concentrically to their orifices 26, 43 by annular grooves 53, 54 which are each made in the surfaces 51, 52 of the mounting plates concentrically to the orifices 26, 43 and in which, in the assembled state, bearing balls 55 are enclosed. The design of a rotational bearing means 50 in the form of a ring bearing 53, 54, 55 provides rotational guidance, with the aid of which the slit 33 can be precisely rotated relative to the beam path axis 17. The rotation of the slit itself is caused by the fact that the piezo-electric element 18, the free end of which is in contact with the stop 45 via the carrier plate 46, is connected to a direct voltage, so that it deflects by a certain amount of length $\Delta x$, so that, via the stop 45 as a first abutment connected to the lower mounting plate 42 and via the carrier plate 47, and the first mounting plate 25 connected thereto, as a second abutment, a rotation of both mounting plates 25, 42 relative to each other takes place, as shown, for example, in FIG. 6.

In addition to mass spectrometers, the device 11 according to the invention can also be used in other spectrometers, for example in optical spectrometers (vacuum spectrograph). The latter is usually provided with a line grating for the absorption of infrared and ultraviolet rays. In front of the line grating, there is an entrance slit, and downstream there is an exit slit. These slits are then formed there by the device 11.

For automatic and remote-operated control of the slit width of the slit means or other diaphragm means of analogous structure, any desired data system 19 consisting of a microprocessor or any desired process computer can be provided.

The data system 19 itself is provided with a digital-/analog converter 20 which converts the digital data signals into analog control signals and transmits these analog signals to appropriate inputs of amplifier devices 21. The outputs of the amplifier devices 21 are each connected to the electrodes of the piezo-electric elements 14, 15. The control signals going from the output of the digital/analog converter 20 to the inputs of the amplifier devices 21 are adjusted by setting means 22, which can, for example, be trimming potentiometers or voltage dividers formed by fixed resistors, in such a way that the slit of the slit means is located centrally relative to the beam path axis 17. One electrode of the piezo-electric element 18, which causes the rotation or tilting of the slit, is connected in the same way to the output of an amplifier device 23. The input of the amplifier device is in turn provided with setting means 24 which can be a potentiometer or the like. By varying the input signal, a different voltage can thus be applied to the piezo-electric element 18, so that, as a function of the adjustment of the setting means 24, the device 11 is rotated relative to the beam path axis 17. The possibility of being able to fine-adjust the angle of rotation alpha by electrical remote control is of particular advantage, since the operator can directly follow the result thus obtained, namely the peak shape, the resolving power and the like, on a display screen, while the rotation of the slit is being initiated. Likewise, the remote-operated slit width adjustment can be monitored directly on a display screen, which leads to a substantial improvement in the operability of the analysis arrangements fitted with such devices 11.

Particularly if the slit width adjustment or, analogously, the adjustment of diaphragm means is carried out via a data system 19, it is possible, for example, automatically to set various operating conditions of the mass spectrometer, such as low resolution, high resolution, and multiple ion detection (MID), all of which require different slit width settings.

In a further application of the device 11, provided with piezo-electric elements 14, 15, 18, for the control of slit widths and for rotating the slit or controlling other diaphragm means of analogous structure, it is possible, for example when used in a mass spectrometer, to vary the slit width continuously or also stepwise during the mass scan, since the piezo-electric elements 14, 15, 18 can follow the electric voltage almost without inertia.

As a result, it is possible to adapt the peak width during the mass scan to the selected scanning function. The exponential scan $m = m_o e^{k_1 t}$, with $m_o$ = starting mass, $k_1$ = a constant and $t$ = time, which is generally usual in conjunction with a data system 19, gives peak widths, which are swept with equal time intervals over the entire mass range, in a mass spectrometer with R = constant. For other scanning functions, for example the parabolic scan $m = k_2 t^2$, with $k_2$ = constant, it is necessary to vary the slit width during the scan, if the mass peaks are also to be swept within equal time intervals, which is an advantage for peak recognition with the data system 19. The parabolic scan is therefore of great importance, since it is that scan with which, at a given power of the magnetic field regulator of the mass spectrometer 10, a defined mass range can be swept most rapidly.

What is claimed:

1. A device for adjusting the slit width of slit means in the beam path of a mass spectrometers for the analysis of organic or inorganic substances comprising:
   a pair of slit jaws forming a set of slit means;
   means for independently supporting said slit jaws near said beam path including a piezo-electric element for providing to and fro movement of at least one of said pair of slit jaws perpendicular to said beam path axis, said movement of one of said slit jaws being independent of said other slit jaw; and means for applying a voltage across said piezo-electric element to controllably deflect said at least one of said jaws toward said beam path a predetermined distance to a new position and maintain said jaw in such position.

2. A device as in claim 1, wherein said supporting means includes a piezo-electric element for moving said other slit jaw.

3. A device as in claim 2, wherein the slit jaws are rotatable about the beam path axis by means of a piezo-electric element.

4. A device as in claims 1 or 2, wherein the movement amplitudes of the piezo-electric elements moving the slit jaws are controllable by a data system.

5. A device as in claim 4, wherein the data system is connected via a digital/analog converter and amplifier devices to the piezo-electric elements of the slit jaws.

6. A device as in claim 5, wherein the amplifier devices are provided at their inputs with setting means for adjusting the slit center.

7. A device as in claim 3, wherein the piezo-electric element effecting the rotation of the slit jaws is controlled by an amplifier device connected to it.

8. A device as in claim 7, wherein the control signal amplitude, determining the degree of rotation of the slit jaws, of the amplifier device is adjustable by setting means.

9. A device as in claim 5, wherein the amplifier devices are operational amplifiers.

10. A device as in claim 2, wherein the device has a first mounting plate with an orifice for letting the beam pass through and comprises carrier plates for receiving said piezo-electric elements, projecting substantially perpendicular from the mounting plate.

11. A device as in claim 10, wherein the carrier plates are provided, at their ends pointing away from the mounting plate, with said slit jaws having slit-forming end parts which are aligned substantially perpendicular to the axis of the beam path, passing through the slit, and projecting into the beam path.

12. A device as in claim 10, wherein the ends, pointing away from the mounting plate, of the carrier plates are in contact with the rear of the slit jaws, the slit-forming end parts of the slit jaws being aligned substantially perpendicular to the axis of the beam path, passing through the slit, and projecting into the beam path.

13. A device as in claim 12, wherein the slit jaws are held in this position by leaf-spring means which are fixed thereto and extend substantially parallel to the carrier plates and which, at their ends remote from the slit jaws, are fixed to a carrier which is fixed on the mounting plate in a region offset from the orifice.

14. A device as in claim 10, wherein a second mounting plate having an orifice for letting the beam pass through is arranged below the first mounting plate to be axially rotatable relative to the latter, which second mounting plate receives, in a region offset from an orifice, a stop which is in contact with a carrier plate receiving the piezo-electric element for rotating the slit jaws, such carrier plate being fixed with its end pointing away from the stop to the first mounting plate.

15. A device as in claim 14, wherein the stop is brought into contact with the carrier plate by spring means.

16. A device as in claim 14, wherein the mounting plates are drawn towards each other by spring means.

17. A device as in claim 14, wherein the mounting plates have rotational bearing means formed concentrically to the orifices.

18. A device as in claim 17, wherein the rotational bearing means are formed by annular grooves which are each made in the surfaces of the mounting plates concentrically to the orifices and in which, in the assembled state, bearing balls are enclosed.

* * * * *